G. W. SELL.
RESILIENT AUTOMOBILE TIRE.
APPLICATION FILED JAN. 5, 1920.
1,368,198.
Patented Feb. 8, 1921.
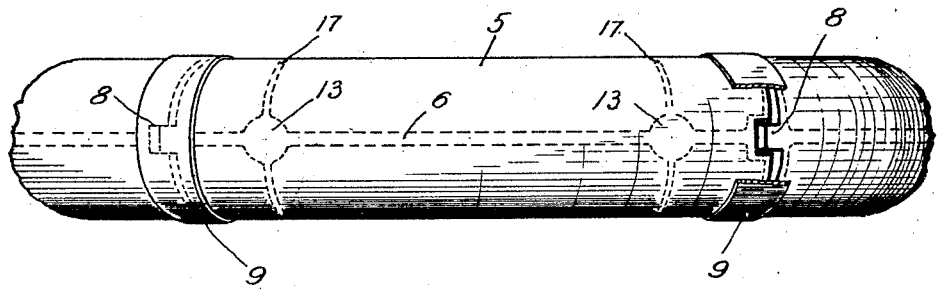
Fig. I.
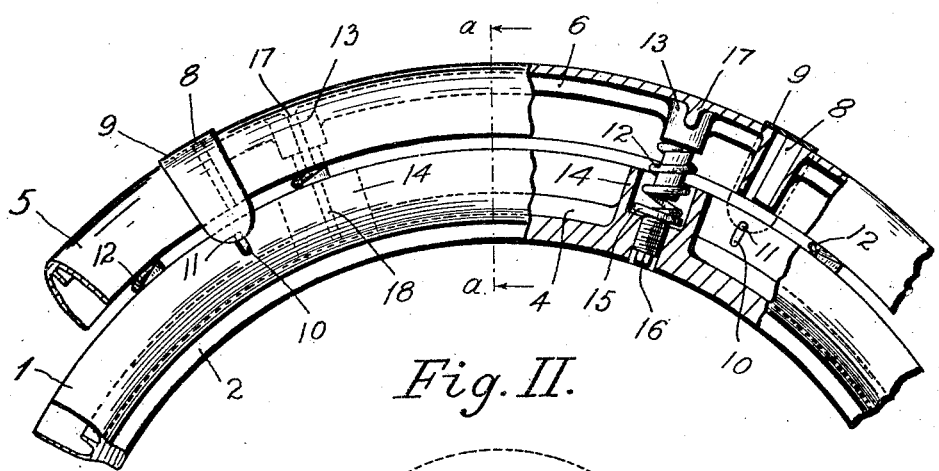
Fig. II.
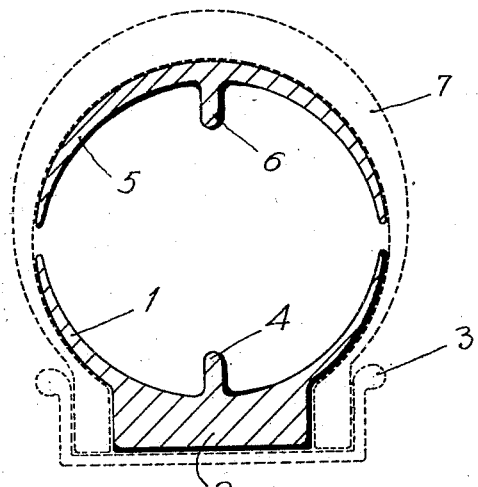
Fig. III.
WITNESSES:
H N Scott
INVENTOR
G. W. SELL.
BY B Goldberg.
ATTORNEY

UNITED STATES PATENT OFFICE.

GEORGE W. SELL, OF PORTLAND, OREGON.

RESILIENT AUTOMOBILE-TIRE.

1,368,198.  Specification of Letters Patent.  Patented Feb. 8, 1921.

Application filed January 5, 1920. Serial No. 349,657.

*To all whom it may concern:*

Be it known that I, GEORGE W. SELL, a citizen of the United States, residing at Portland, in the county of Multnomah and State of Oregon, have invented a new and useful Resilient Automobile-Tire, of which the following is a specification.

My invention relates to resilient automobile tires in which the customary rubber tube is supplanted by a metallic structure, partly in segments, in which resiliency is supplied by a plurality of springs disposed within said structure.

The objects of my invention are to produce a puncture proof tire which possesses easy riding qualities, which is light in construction, which will last indefinitely and eliminates the cost and trouble of pumping, patching and repairing.

I attain these objects with the mechanism illustrated in the accompanying drawing, in which—

Figure I is a plan view of a portion of my tire.

Fig. II is a side view of a portion of my tire, part of it being shown in section.

Fig. III is an enlarged section through Fig. II along the line *a—a*.

Similar numerals refer to similar parts throughout the several views.

My tire is constructed of very light metal, preferably aluminum, and consists essentially of two parts which, for the sake of convenience, may be designated as base portion and tread portion.

The base portion 1 is composed of one integral ring, somewhat crescent shaped in cross section, except that the base 2 is thickened and adapted to fit the demountable split rim 3 shown in dotted lines in Fig. III. A stiffening rib 4 lends additional strength to the ring.

The tread portion 5 is also crescent shaped in cross section, has the stiffening rib 6, and hugs the tire casing 7, Fig. III, in a manner similar to a rubber tube, except that sufficient space for deflection between base and tread is allowed. But, instead of being cast as one solid ring, the tread is built up of six segments, one of which is shown complete in Fig. II. As illustrated there the ends 8 of each segment are closed by a cross wall and tongued and grooved into each adjoining segment whereby lateral displacement is prevented, while sufficient play between the joints is left to permit, under pressure from the road, a sliding of the segment toward the center of the wheel. A thin steel clip 9 placed over each joint holds the segments in yieldable alinement to each other and to the base portion, facilitates assembly, and prevents the sharp edges of the joint from cutting into the casing. The steel clips fasten into the slots 10 of the base portion with suitable hooks or pins 11. Said slots 10 permit the clip 9 to move radially with the segments when pressure is brought to bear on that point.

Resiliency is imparted to my tire by a number of helical springs disposed radially between tread and base portion, two of these springs being allotted to each segment.

The broken portion in Fig. II illustrates clearly the manner in which one of these springs, designated by the numeral 12, is secured within the tire. A stud 13, cast into the tread portion, serves as retainer and counterbearing for one end of the spring, while the socket 14 cast into the base portion receives the other end. The washer 15 at the bottom of the socket provides an even bearing for the spring 12 and the adjusting screw 16 under the washer permits a raising of the latter to give the necessary tension to the spring.

The rim 3 should, of course, have apertures in alinement with the screws 16, so that adjustment can be made at any time without demounting the tire.

The cross ribs 17 at the studs 13 and similar cross ribs 18 (indicated by dotted lines in Fig. II) at the sockets 14 add to the rigidity of stud and socket.

Having thus described my invention, it will be seen that my objects have been accomplished and, though I have shown the preferred form of construction, I reserve to myself the right to make minor changes, provided I do not violate the spirit and principle of my invention.

I claim:

In a resilient automobile tire, the combination of an integral, circular base portion, crescent-shaped in cross section with a thickened base at the convex side and a reinforcing rib at the concave side, a tread portion composed of individual sections substantially crescentiform in cross section with a reinforcing rib at the concave side, the individual sections of said tread portion joining each other with tongue-and-groove joints to permit flexion in radial directions, resilient means interposed between the tread and base portion, with steel clips covering the joints in the tread portion, said steel clips having hooks to engage slots in the base portion and to hold the sections of the tread portion in yieldable alinement.

Signed by me at Portland, Oregon, this 29th day of December, 1919.

GEORGE W. SELL.